United States Patent [19]

Barrett

[11] 4,253,762

[45] Mar. 3, 1981

[54] PHOTO ENLARGER REMOTE FOCUSING CONTROL

[76] Inventor: Walter J. Barrett, 341 E. 6th St., Apt. 4A, New York, N.Y. 10003

[21] Appl. No.: 92,567

[22] Filed: Nov. 8, 1979

[51] Int. Cl.³ .............................................. G03B 27/52
[52] U.S. Cl. ...................................... 355/55; 354/195
[58] Field of Search ................... 355/18, 55, 58, 59, 355/62, 63, 133; 354/195; 350/243, 256

[56] References Cited

U.S. PATENT DOCUMENTS

| 1,406,041 | 2/1922 | Lehto | 355/58 |
| 1,715,526 | 6/1929 | Williamson | 355/59 |
| 1,925,524 | 9/1933 | Del Riccio | 354/195 |
| 3,989,373 | 11/1976 | Craig | 355/63 X |

FOREIGN PATENT DOCUMENTS 375216  3/1964  Switzerland ............................... 355/55

Primary Examiner—Richard A. Wintercorn
Attorney, Agent, or Firm—Christel, Bean & Linihan

[57] ABSTRACT

Means for adjusting the focusing shaft of a photographic enlarger of the projection enlargement type from a relatively remote point comprising rod means extending generally at right angles to the focusing shaft of the enlarger. A chuck member is rotatably connected to said rod means adjacent to one end thereof and concentrically with respect to the focusing knob of said shaft and adapted to be releasably attached to said knob. A bevel gear drive connects beween said chuck member and the adjacent end of the rod means whereby the user may rotate the rod means from the other end thereof to rotate the focusing knob and shaft from a point relatively remote from the enlarger. The rod means comprises a plurality of telescoping members whereby the user may readily adjust the effective length of said rod means.

5 Claims, 4 Drawing Figures

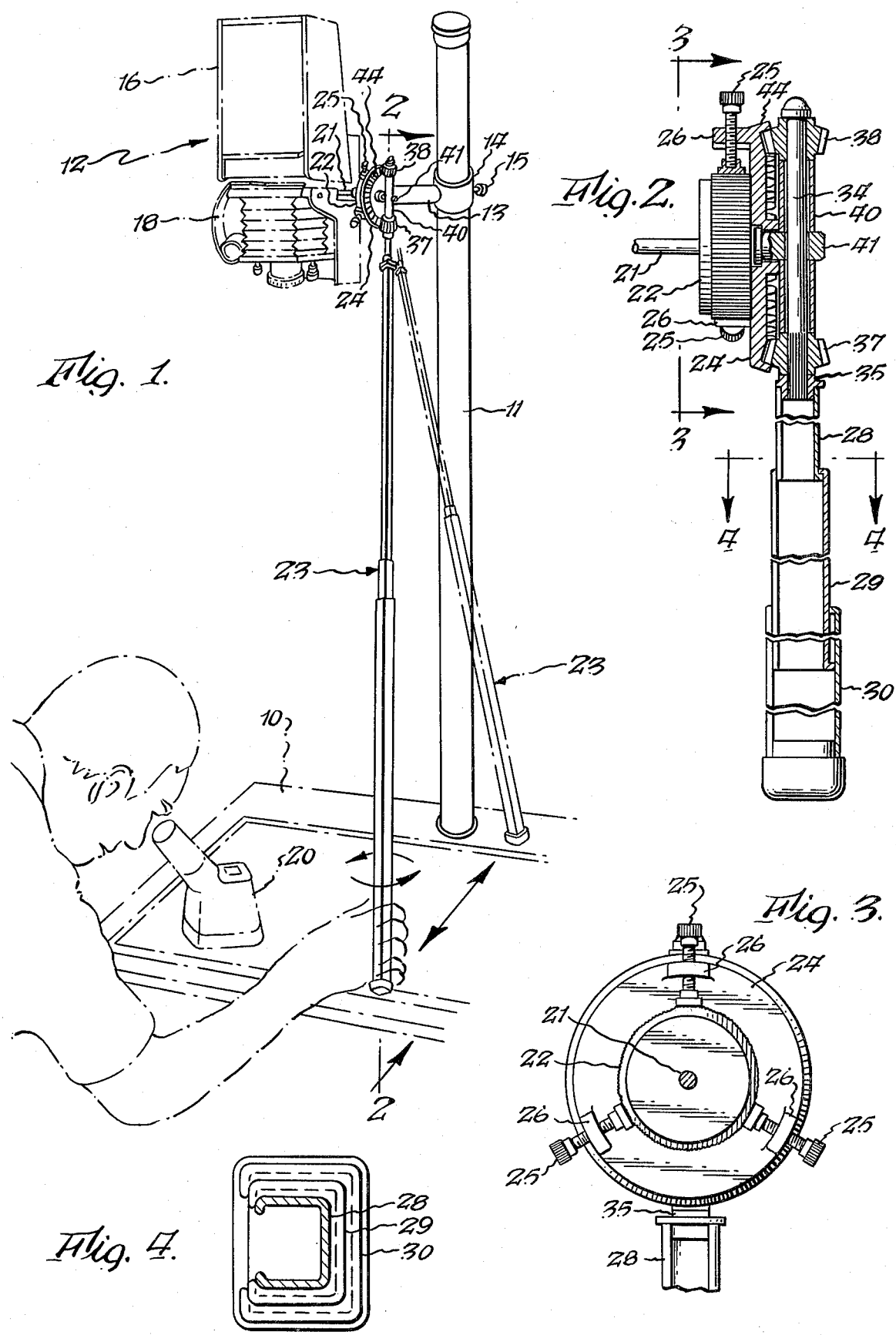

PHOTO ENLARGER REMOTE FOCUSING CONTROL

BACKGROUND OF THE INVENTION

This invention relates to the art of photography and particularly to the process of photographic printing by projection enlargement and the present invention relates particularly to facilitating the attainment of accurate focus of the enlarging device by a manually operated remote control.

Conventional photographic enlargers of the type here under consideration comprise a paper table upon which the photographic paper is placed, an upright pole or pair of poles mounted at the rear of the baseboard, and a lamp house assembly which can be moved up and down the girder or pole structure to increase or decrease the size of the projected enlargement on the paper table or easel upon which the sensitized print paper is placed.

The closest prior art patents known to the applicant are Lehto U.S. Pat. No. 1,406,041 and Williamson U.S. Pat. No. 1,715,526 but these patents relate to composite machines wherein the camera height and the lens focus are jointly related in such a manner that automatic focusing is accomplished. This is a much more complicated construction. In the device of the present invention, the extension from the manual focus enlarger to the vicinity of the paper table is such that it may be readily applied to existing manual focus enlargers.

SUMMARY OF THE INVENTION

The present invention provides an accessory for manual focus enlargers of the projection enlargement type so that an operator may effect accurate focussing of the enlarger lens system while his attention is directed more closely to the image being produced on the print paper on the paper table. In some instances the distance from the projector to the paper table may be as much as five feet or more. This is accomplished by providing what may be considered to be a radial extension of the focusing knob of the enlarger which extension is readily attachable to and removable from such focusing knob.

A telescoping rod means is attached at one end to the focusing knob of the enlarger and includes a chuck assembly for effecting such fastening. The opposite end of the rod means, when the same is in position of use, extends downwardly to the vicinity of the paper table where it is within easy reach of the operator. The rod means comprises a series of telescoping members so that the effective length thereof may be readily adjusted.

A bevel gear drive is provided between the rod means and the chuck element and in the present instance the drive means comprises a pair of pinions mounted at the upper end of the shaft which engage at diametrically opposite points with a bevel ring gear secured to the chuck means. Thus, a gear ratio is provided which facilitates obtaining relatively fine adjustment of the focusing shaft.

BRIEF DESCRIPTION OF THE DRAWING

FIG. 1 of the drawing is a perspective view of a conventional photographic enlarger of the projection enlargement type wherein the enlarger assembly is supported above a paper table and adapted to be adjusted vertically with respect thereto and which includes one form of the focusing control means of the present invention;

FIG. 2 is a fragmentary cross sectional view on the line 2—2 of FIG. 1;

FIG. 3 is a fragmentary cross sectional view on the line 3—3 of FIG. 2; and

FIG. 4 is a cross sectional view on the line 4—4 of FIG. 2.

DESCRIPTION OF THE ILLUSTRATED EMBODIMENT

Referring first to FIG. 1, the numeral 10 designates a paper table of the type used in projection enlargement and a post 11 extends rigidly upwardly therefrom to support an enlarger designated generally by the numeral 12, the enlarger having a stub shaft 13 projecting therefrom which terminates in a collar 14. A set screw 15 locks the collar 14 vertically along the shaft 11 at any desired elevational position of the enlarger 12.

The enlarger 12 includes a lamp house 16 and in FIG. 1 the numeral 18 indicates a negative which is projected horizontally through the lower portion of the lamp house for printing enlargements in a well known manner.

The structure thus far described is entirely conventional and the numeral 20 designates a conventional image magnifier which is employed for checking on the proper focus of the image projected by the enlarger to the photographic paper on the paper table 10.

The shaft 21 appearing in FIG. 3 is the focusing shaft of the conventional projection enlarger and the numeral 22 designates a knob normally employed to adjust the focusing shaft 21. So much of the structure as has been described thus far is entirely conventional and reference will now be had to the improved means of the present invention for focusing the enlarger by means of a remotely extending rod assembly designated by the general reference numeral 23. Without the auxiliary mechanism of the present invention it is frequently impossible for the operator to simultaneously inspect the image by means of the image magnifier 20 and adjust the focusing shaft 21 by means of knob 22 because of the distance between the focusing knob and the paper table.

In the structure of the present invention a chuck element 24 is provided which is adapted to fit over adjusting knob 22 and be centered coaxially thereon by means of adjusting screws 25 which engage lugs 26 on the chuck element 24 as shown in FIGS. 2 and 3.

The control rod designated generally in FIG. 1 by the numeral 23 in the present instance comprises three telescoping elements 28, 29 and 30 as shown in FIGS. 2 and 4. These three telescoping members are in the present instance of hollow generally rectangular form whereby manual rotation of the lowermost member 30 produces equal angular rotation of the uppermost of the telescoping rod members 28.

The upper end of the uppermost rod member 28 has attached thereto a spindle 34 by means of a collar 35 and a pair of bevel pinions 37 and 38 are mounted on spindle 34. In the present instance the lower pinion 37 is fixed to spindle 34 for rotation therewith and the upper pinion 38 is mounted for free rotation on spindle 34. A spacing tubular member 40 maintains proper axial spacing of pinions 37 and 38 and also cooperates with a stub shaft member 41 which meshes with the bevel pinions 37 and 38 so that rotation of the adjusting shaft assembly 23, acting by driving rotation of pinion 37, rotates bevel gear 44 and consequently rotates the focusing knob 22 and focusing shaft 21 in either direction.

Thus an operator, as shown in FIG. 1, can closely inspect the projected enlargement on the paper table 10 and simultaneously operate the adjusting shaft of the focusing mechanism as clearly shown in FIG. 1.

After proper adjustment is achieved the operator may move the rod mechanism 23 out of the way of the projected enlarging beam by placing the same in the dot and dash line position shown in FIG. 1.

A typical embodiment of the present invention has been described herein and shown in the accompanying drawing to illustrate the underlying principles of the invention, but it is to be understood that numerous modifications may be made without departing from the broad spirit and scope of the invention.

I claim:

1. Adjusting means for operating the focusing shaft and the shaft adjusting knob of a photographic enlarger from a relatively remote point comprising rod means extending generally at right angles to the focusing shaft of the enlarger, a chuck member rotatably connected to said rod means adjacent to one end thereof and concentrically with respect to said focusing knob and adapted to be releasably attached to said knob, and a bevel gear connection between one end of said rod means and said chuck member whereby the user may rotate the rod means from the other end thereof to rotate the focusing knob and shaft from a point relatively remote from said focusing knob.

2. Adjusting means according to claim 1 wherein said rod means comprises a plurality of telescoping members whereby the user may readily adjust the effective length of said rod means.

3. Adjusting means according to claim 2 wherein said telescoping members include means for preventing relative rotation of said telescoping members to insure accurate adjustment of said focusing shaft.

4. Adjusting means according to claim 1 wherein said bevel gear connection comprises a bevel ring gear fixed to said chuck member and a mating pinion fixed to the adjacent end of said rod means for relatively fine adjustment of said focusing shaft.

5. Adjusting means according to claim 4 wherein a second mating pinion rotatable on said rod means meshes with said ring gear at a point diametrically opposite said first mentioned pinion to provide a planetary bevel gear connection between said rod means and said focusing shaft.

* * * * *